United States Patent [19]

Marrs et al.

[11] 3,900,691

[45] Aug. 19, 1975

[54] METHOD OF COATING A POLYOLEFIN SURFACE AND THE COATED ARTICLE

[75] Inventors: Oren L. Marrs; Larry P. Mozer, both of Bartlesville, Okla.

[73] Assignee: Phillips Petroleum Company, Bartlesville, Okla.

[22] Filed: June 13, 1974

[21] Appl. No.: 479,124

Related U.S. Application Data

[63] Continuation-in-part of Ser. No. 279,099, Aug. 9, 1972, abandoned.

[52] U.S. Cl. .................. 428/451; 428/517; 264/94; 427/407
[51] Int. Cl. ...................... B32b 27/32; B65d 23/02
[58] Field of Search . 117/72, 95, 94, 76 F, 138.8 E; 215/1 C, DIG. 6

[56] References Cited
UNITED STATES PATENTS

| | | | |
|---|---|---|---|
| 2,824,024 | 2/1958 | Chapman | 117/76 F |
| 2,943,000 | 6/1960 | Austin | 117/72 |
| 3,281,383 | 10/1966 | Zelinski et al. | 260/23.7 R |
| 3,427,269 | 2/1969 | Davis et al. | 260/27 R |
| 3,442,687 | 5/1969 | Hagan | 117/72 |
| 3,449,479 | 6/1969 | Cines | 264/94 X |
| 3,505,098 | 4/1970 | Miller et al. | 117/72 X |
| 3,513,056 | 5/1970 | Middlebrook | 156/309 |
| 3,753,936 | 8/1973 | Marrs | 260/27 R |

*Primary Examiner*—Ralph Husack

[57] ABSTRACT

The permeability of a polyolefin is reduced by a coating which comprises a primer and a barrier. The primer is formed of a copolymer of a conjugated diene and a vinyl aromatic hydrocarbon. The barrier is a polymer of vinyl chloride or vinylidene chloride or a copolymer of vinyl chloride and vinylidene chloride.

9 Claims, No Drawings

METHOD OF COATING A POLYOLEFIN SURFACE AND THE COATED ARTICLE

This application is a continuation-in-part of copending application Ser. No. 279,099, filed Aug. 9, 1972 now abandoned.

The use of polyolefin containers such as polyethylene and polypropylene bottles and the like is well known. Such containers often have applied to their surfaces a barrier coating which prevents diffusion of the contents through the container wall. It is frequently necessary that an undercoating or primer be applied to the polyolefin surface in order to facilitate the adherence of the barrier coating. However, in those instances in which the primer fails, the barrier coating also fails. For this reason, numerous attempts have been made to develop improved primer coats.

This invention provides an improved coating which comprises a primer layer and a barrier layer. The primer is formed of a copolymer of a conjugated diene and a vinyl aromatic hydrocarbon. The barrier is a polymer of vinyl chloride or vinylidene chloride or a copolymer of vinyl chloride and vinylidene chloride.

The primer of this invention can be used in conjunction with any polyolefin surface. Inasmuch as the primer is elastomeric, it can be applied to the polymeric surface before the polymer is formed into its final shape or it can be applied to the surface of the plastic after the shaping of the article. The primer can be applied to the polymeric surface either in conjunction with, or in the absence of, treatment of the surface. Any method of application of the primer including spraying, brushing and dipping can be used.

The primer of this invention can be used in conjunction with a barrier coating which can be applied as an emulsion. Both the primer coating and the barrier coating can be applied in a plurality of coats.

The primer is formed of a block copolymer of the type $(A-B)_xY$, where A represents nonelastomeric polymer segments, B represents elastomeric polymer segments, Y is an atom or group of atoms derived from a polyfunctional compound used in the formation of the copolymer and having at least three reactive sites, and $x$ is an integer of at least 3. These copolymers are formed from at least one conjugated diene of 4 to 12 carbon atoms and at least one vinyl aromatic hydrocarbon wherein the weight ratio of conjugated diene to vinyl aromatic hydrocarbon is in the range of about 60/40 to 85/15. Suitable copolymers of the foregoing type for use in the primer coating and methods of forming such copolymers are set forth in U.S. Pat. Nos. 3,281,383 and 3,753,936, the disclosures of which are herein incorporated by reference. The copolymer will comprise from about 12 to about 20 weight percent of the total primer composition. One suitable copolymer is commercially available at Solprene 411 (a trademark) from Phillips Petroleum Company as a radial teleblock copolymer of butadiene/styrene, 70/30, coupled with silicon tetrachloride.

The primer will also be comprised of a tackifier in an amount from about 12 to about 20 weight percent of the total primer composition. Suitable tackifiers are rosin, rosin derivatives, polyterpene resins, coumarone-pentene resins, thermoplastic phenolic resins, hydrogenated rosin esters of pentaerythritol, coumarone-indene resins, hydrocarbon resins derivable from olefins or aromatic compounds or mixtures thereof, and the like. A tackifier such as Piccolyte 6115-1/2 (a trademark) from PICCO Chemical Company is particularly suitable for use in the present invention.

The primer can also contain an antioxidant; one which can be used is an octadecyl ester of 3(3,5-di-tert-butyl-4-hydroxy)phenylpropionic acid in an amount of about 0.2 part per 100 parts by weight. This antioxidant is available commercially as Irganox 1076 (a trademark) from Geigy Chemical Company.

The primer will also contain a carrier. Any suitable solvent such as naphtha or toluene, or mixtures thereof, in a ratio of about 80 weight percent naphtha and 20 weight percent toluene, can be used. The carrier will comprise from about 60 to about 80 weight percent of the primer composition. Other suitable carriers (solvents) include: paraffins such as pentane, hexane, heptane, octane, nonane and the like; cycloparaffins such as methylcyclopentane, cyclohexane, methylcyclohexane and the like; aromatic hydrocarbons in addition to toluene, such as benzene, xylenes and the like; and other liquid organic solvents such as halogenated hydrocarbons, ethers, ketones, esters and the like. Mixtures of these solvents can be employed.

The primer can also contain such additional materials as pigments, wetting agents, curatives, reinforcing agents, fillers and the like.

In a preferred embodiment of this invention, the primer has the following composition:

| Component | Parts by Weight |
| --- | --- |
| (a) Butadiene/styrene 70/30 (Radial copolymer)[1] | 40 |
| (b) Tackifier[2] | 40 |
| (c) Naphtha | 149.2 |
| (d) Toluene | 37.2 |
| (e) Antioxidant[3] | 0.4 |

[1]Solprene 411, described above.
[2]The tackifier used was PICCOLYTE 6115-1/2 which is a petroleum hydrocarbon resin available from PICCO Chemical Co.
[3]The antioxidant used was IRGANOX 1076 which is the octadecyl ester of 3-(3,5-di-tert-butyl-4-hydroxy)phenylpropionic acid available from Geigy Chemical Co.

The barrier is formed of a polymer of vinyl chloride or vinylidene chloride or a copolymer of vinyl chloride and vinylidene chloride. In the copolymers, vinylidene chloride is present in an amount of at least 50 weight percent, preferably 80 to 90 weight percent. Such compositions are commercially available, and can be applied as solutions or emulsions.

The primer can be applied to either the internal or to the external surface of the container, or both. Preferably, the primer will be applied to the internal surface of the shaped container by filling the container with the primer, agitating to insure coverage of the surface, removing the excess primer and oven drying. The barrier coating is then applied to the primed surface in the usual manner.

The following Examples I and II illustrate this invention.

EXAMPLE I

Polyethylene parisons were electrically surface treated by passage twice through a Lectro-Treat unit at a rate of 2.5 feet/minute and were then filled with a primer formulation with the following composition: 15.0 weight percent butadiene/styrene (70/30) radial copolymer, 15.0 weight percent PICCOLYTE tackifier, 55.9 weight percent naphtha, 13.95 weight percent toluene and 0.15 weight percent IRGANOX 1076 antioxidant. The parisons were drained, and oven dried at 260° F. for 15 minutes to give a tack-free surface. These parisons primed on the inner surface were then blown into 7-ounce wasp-waist bottles. A barrier coating of a vinylidene chloride/vinyl chloride copolymer was then applied by filling the primed 7-ounce wasp-waist bottles with a 15 weight percent solution of Dow Saran XD 2364.2 (a polymer containing over 80% vinylidene chloride, Dow Chemical Co.) in methyl ethyl ketone. The bottles were then drained and oven dried at 200° F. for 45 minutes to give a barrier coating on the inside surface of the bottles.

In a gasoline permeation test, the percent weight loss of a bottle containing gasoline was 0.2% in 20 hours and 1.5% in 122 hours. The percent weight loss of an uncoated polyethylene bottle containing gasoline was 3.4% in 20 hours and 23% in 122 hours.

EXAMPLE II

Polyethylene parisons were filled with the primer composition described in Example I, drained and oven dried at 260° F. for 15 minutes. The parisons were then filled with a 15 weight percent solution of Dow Saran XD 2364.2 in methyl ethyl ketone, drained and oven dried at 260° F. for 15 minutes. The parisons were blown into 7-ounce wasp-waist bottles and used in a gasoline permeation test. The percent weight loss of a bottle containing gasoline was 0.4% in 20 hours and 5.6% in 122 hours.

The following Example III shows the result of using a commercially available primer in coating bottles.

EXAMPLE III

Seven-ounce polyolefin wasp-waist bottles were electrically surface treated by passage once through a Lectro-Treat unit at a rate of 2.5 feet/minute and were then immersed in a commercial primer (Accobond 1094 from American Cyanamid Co.) diluted 5 to 1 with water. The bottles were removed from the primer solution and oven dried at 260° F. for 8 minutes. The primer coated bottles were then immersed in a 10 weight percent solids Dow Saran XD 4655 (a polymer containing over 80% vinylidene chloride, Dow Chemical Co.) emulsion coating before being oven dried at 260° F. for 8 minutes. The immersion procedure and subsequent drying procedure to apply the barrier coating was repeated.

In a gasoline permeation test, a bottle coated by the procedure of this example showed a weight percent loss of 0.6% in 20 hours and 8.8% in 122 hours. It can be seen by the 122 hour data that the bottles of Examples I and II using the inventive primer were less permeable in the gasoline permeation test than the bottle prepared in Example III using the commercial primer.

The following Example IV describes the coating of bottles using two applications of a methylethyl ketone solution of vinylidene chloride/vinyl chloride copolymer.

EXAMPLE IV

Polyethylene parisons were electrically surface treated as in Example I and filled with a 10 weight percent solution of Dow Saran XD 2364.2 in methylethyl ketone. The parisons were drained and oven dried at 260° F. for 15 minutes. The parisons were blown into seven-ounce wasp-waist bottles and filled with a 15 weight percent solution of Dow Saran XD 2364.2 in methylethyl ketone. The bottles were drained and oven dried at 200° F. for 45 minutes.

In a gasoline permeation test, bottles coated by the procedure of this example showed a weight percent loss of 3.3% in 20 hours and 23.0% in 122 hours. This shows that the primer of Example I is required to give a coated bottle with low permeability in the gasoline permeation test.

The following Example V describes the preparation of coated bottles without the use of a primer wherein the outer surface of the parison is contacted with a solution of vinylidene chloride/vinyl chloride copolymer.

EXAMPLE V

Polyethylene parisons were electrically surface treated as in Example I and parison ends were sealed before immersion in a 50 weight percent solids emulsion Dow Saran XD 4655. The parisons were drained, oven dried at 260° F. for 15 minutes, and blown into seven-ounce wasp-waist bottles.

Bottles prepared by the procedure of this example were subjected to a gasoline permeation test and showed 0.6 weight percent loss in 20 hours and 11.0 weight percent loss in 122 hours. This shows the importance of the primer in obtaining a good barrier coating. In Example I using the primer of this invention, the weight percent loss in the gasoline permeation test was only 1.5% in 122 hours.

While this invention has been described in conjunction with presently preferred embodiments, it obviously is not limited thereto.

What is claimed is:

1. A method of treating a polyolefin surface which comprises:

a. applying to said surface a first composition consisting essentially of a copolymer of butadiene and styrene, said butadiene constituting about 70 weight percent of said copolymer, a carrier in which said copolymer is soluble and a tackifier, said copolymer comprising from about 12 to about 20 weight percent of said first composition; and b. applying a second composition in contact relationship to said first composition, said second composition being selected from copolymers of vinylidene chloride and vinyl chloride.

2. The method of claim 1 in which said first composition contains an antioxidant.

3. The method of claim 1 in which said tackifier is selected from the group consisting of rosin, rosin derivatives, polyterpene resins, coumaronepentene resins, thermoplastic phenolic resins, hydrogenated rosin esters of pentaerythritol, coumarone-indene resins, and hydrocarbon resins derivable from olefins or aromatic compounds.

4. A polyolefin article having a multilayer coating on the surface thereof to reduce permeability, said coating comprising:

a primer coating in contact with the polyolefin article surface, said primer coating comprising a tackifier and a copolymer of at least one conjugated diene of 4 to 12 carbon atoms and at least one monovinyl-substituted aromatic hydrocarbon, said diene and aromatic hydrocarbon being in a weight ratio of 60/40 to 85/15, said copolymer being a block copolymer of the form $(A-B)_xY$, where each A is a nonelastomeric polymer segment, each B is an elastomeric polymer segment, Y is an atom or group of atoms derived from a polyfunctional compound having at least 3 reactive sites, and $x$ is an integer of at least 3; and a barrier coating in contact with the primer coating, said barrier coating comprising a polymer of vinyl chloride of vinylidene chloride or a copolymer of vinyl chloride and vinylidene chloride.

5. The article of claim 4 wherein the copolymer of said primer coating is a copolymer of butadiene and styrene.

6. The article of claim 5 wherein said barrier coating is a copolymer of vinyl chloride and vinylidene chloride.

7. The article of claim 5 wherein Y is silicon tetrachloride.

8. The article of claim 5 wherein said primer coating contains an antioxidant.

9. The article of claim 5 wherein said tackifier is selected from the group consisting of rosin, rosin derivatives, polyterpene resins, coumarone-pentene resins, thermoplastic phenolic resins, hydrogenated rosin esters of pentaerythritol, coumarone-indene resins, and hydrocarbon resins derivable from olefins or aromatic compounds.

* * * * *

UNITED STATES PATENT AND TRADEMARK OFFICE
CERTIFICATE OF CORRECTION

PATENT NO. : 3,900,691
DATED : August 19, 1975
INVENTOR(S) : Oren L. Marrs and Larry P. Mozer It is certified that error appears in the above-identified patent and that said Letters Patent are hereby corrected as shown below:

Column 5, line 7, delete "chloride of vinylidene chloride" and insert therefor --- chloride or vinylidene chloride ---.

Signed and Sealed this twenty-fifth Day of November 1975

[SEAL]

Attest:

RUTH C. MASON
*Attesting Officer*

C. MARSHALL DANN
*Commissioner of Patents and Trademarks*